No. 655,972. Patented Aug. 14, 1900.
R. HAKEWESSELL & E. C. HENN.
CLUTCH.
(Application filed Dec. 9, 1899.)
(No Model.)
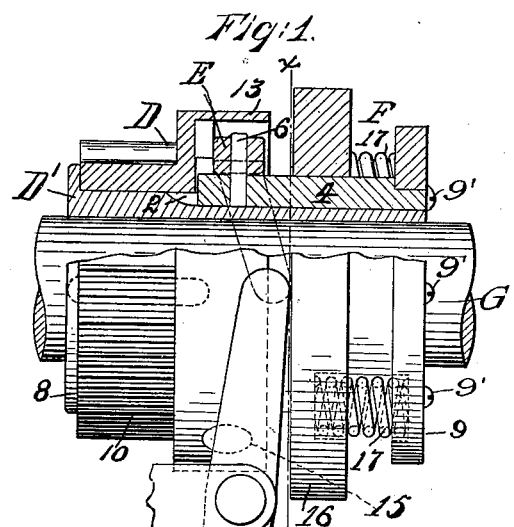
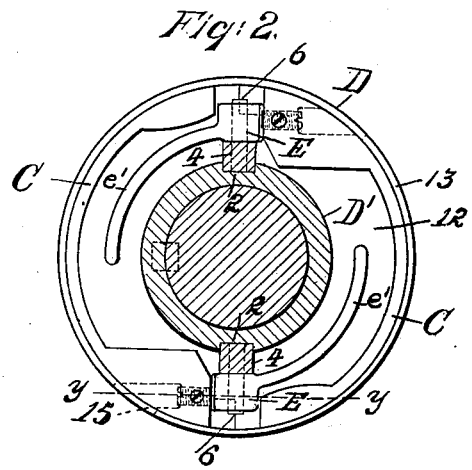
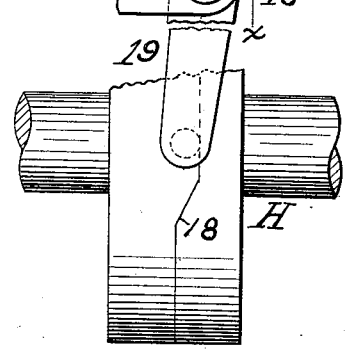
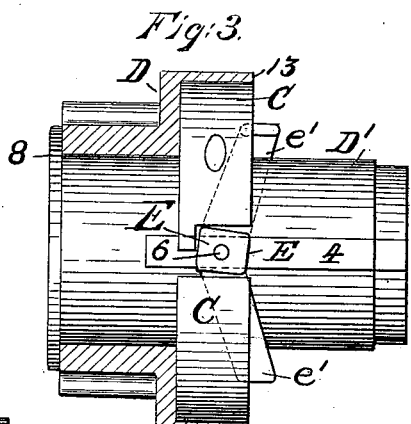
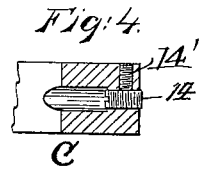
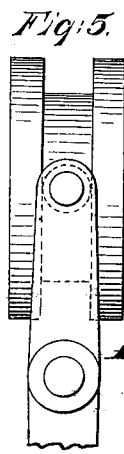
Witnesses
L. H. Blood.
M. H. Flynn
Inventors
Reinhold Hakewessell
and Edwin C. Henn,
by their Attorney

UNITED STATES PATENT OFFICE.

REINHOLD HAKEWESSELL, OF HARTFORD, AND EDWIN C. HENN, OF BLOOMFIELD, CONNECTICUT.

CLUTCH.

SPECIFICATION forming part of Letters Patent No. 655,972, dated August 14, 1900.

Application filed December 9, 1899. Serial No. 739,775. (No model.)

*To all whom it may concern:*

Be it known that we, REINHOLD HAKEWESSELL, a resident of Hartford, and EDWIN C. HENN, a resident of Bloomfield, in the county of Hartford and State of Connecticut, citizens of the United States of America, have invented certain new and useful Improvements in Clutches, of which the following is a specification.

This invention relates to clutches of that class known as "friction-clutches," one object of this invention being to furnish an improved clutch of this class that will occupy the minimum amount of space, will be strong, durable, and efficient; may be quickly assembled and disassembled, and will have a quick positive action without the injurious hammering or impinging incidental to many clutches of this class.

A further object of this invention is to produce a clutch embodying reactionary means for normally retaining the driving and driven members in clutched engagement and also embodying means for automatically releasing said members.

With these objects in view the invention consists in certain details of construction and in the combination and organization of the several parts of the clutch, substantially as hereinafter described, and set forth in the claims.

In the drawings accompanying and forming part of this specification, Figure 1 is a side elevation, partly in section, of a clutch mechanism embodying the invention in the preferred construction and organization thereof. Fig. 2 is a cross-section taken in dotted line in Fig. 1 as seen from the right in said figure. Fig. 3 is a side elevation with the driving member in cross-section and the lever-actuator removed. Fig. 4 is an oblique section of one of the ring-sections, taken on line $y\ y$ in Fig. 2; and Fig. 5 is a side view of a modified form of lever-actuator.

Similar characters represent like parts in all the figures of the drawings.

In the preferred construction and organization thereof shown in the accompanying drawings the clutch comprises two relatively-concentric rotative members designated by D and D', respectively, the former of which constitutes in this form a "driving" member and the latter a "driven" member, and the former of which is preferably supported upon the latter for independent rotative movements, an expansile ring carried by the driven member and preferably including two ring-sections or ring members, each of which is designated by C, a ring-expander (designated in a general way by E) having a cam-like portion disposed between adjacent ends of the ring-sections, and a ring-expander actuator, (designated in a general way by F,) all of which elements are constructed and organized substantially as hereinafter described.

The member D', which in the present organization is fixed to a shaft or spindle indicated at G and which constitutes the driven member, is shown having two diametrically-opposite keyways or seats 2 and 2, in which are seated for removal keys or carrier 4 and 4, which have at their inner ends outwardly-extending pins or pivots 6 and 6, the axes of which are substantially radial to the axis of said driven member. This member, furthermore, is shown having at opposite ends thereof annular flanges 8 and 9 for holding the associated parts of the clutch against displacement relatively. One of these flanges, as 8, may be formed integral with one end of the member D', while the other flange, as 9, will preferably be removably secured to the other end of said member by screws, as 9', whereby to permit the removal of the keys or carriers 4 and 4, as will be readily understood by reference to Fig. 1 of the drawings.

The member D, which in this organization is shown loosely mounted on the member D', constitutes the driving member and is shown in the nature of a gear wheel or pinion 10, recessed on its inner face at 12 or furnished with a circumferential flange or rim 13 in any suitable manner, said member D being preferably mounted upon the driven member D' for rotative movement and bearing against the flange 8 thereof.

Inasmuch as the rotative member D' may constitute the driving member and the rotative member D the driven member it is distinctly to be understood that the terms "driving" and "driven," as applied to the two rotative members, respectively, are used for convenience and where used in the claims without specific qualifying adjectives are intended to apply to either rotative member D or D' without choice.

The expansile ring which constitutes the coöperating rotated friction member and which is shown as fixed as against rotation with respect to and practically constituting a part of the driven member consists in the form thereof herein shown of two ring sections or members C and C and is disposed adjacent to the annular flange of the driving member in position to operatively engage said member, each section being particircular in construction and being provided at one end, preferably integral therewith, with an enlargement or butt, through which is formed a screw-threaded opening, which extends from the extreme end to the periphery thereof, as shown most clearly in Fig. 4. In this opening is an adjusting-screw 14, the head of which is accessible through an opening 15, formed through the rim or flange 13 of the driving member, which opening 15 is adapted to register with said screw-threaded opening. A set-screw 14' is provided for holding the adjusting-screw 14 in adjusted position, said set-screw extending through the butt-end of the ring-section at right angles to and abutting at its inner end against the screw 14, as shown in Fig. 4.

In the organization herein shown the ring-expander includes two members, duplicated in construction and each of which is designated by E, each member being shown as a ring-expanding cam and pivotally supported between the end of adjacent ring-sections in position to expand the same.

As a convenient means for supporting the ring-expanders and facilitating their ready removal each has a perforation therethrough and is pivotally supported upon the pivot or pin 6 at the inner end of the key 4, supported in the keyway in the driven member.

Each expander E in the form shown has a laterally-extended curved arm or lever e', which when the parts are assembled and are in an unclutched position is disposed substantially concentric to the rotative members D and D' and is wholly located within the circle of the inner face of expansile ring and with its free end extended slightly beyond the side or outer edge of said ring in position to be readily operated to effect a rotative ring-expanding movement of the ring expander or cam.

While it is desirable to employ two ring expanders or cams E, one at each side of the driven member and the necessary accessories therefor, so as to secure better frictional engagement between the ring and driving member at diametrically-opposite points, it will be obvious that one or more ring-expanders and one or more carriers therefor may be employed within the purview of this invention.

As a convenient means for operating the ring expander or cam it is preferred to employ an actuator F, which will be reactionary in its operation and will normally hold the expander or cam in a ring-expanding position and to provide coöperative automatic means, such as designated by H, for imparting a retractive or ring-releasing movement to said actuator F; but it will be obvious that modifications of the actuator F and said coöperative means may be employed without departure from this invention. In other words, means may be employed, such as indicated in Fig. 5, for operating the actuator (an actuator such as shown at F' in Fig. 5) in both directions to expand or effect the contraction of the expanding-ring, such means being any suitable or well-known clutch-member shifter—as, for instance, a fork actuated by hand or otherwise—and in which case the actuator would not be reactionary in its operation. In the form thereof shown in Fig. 1 of the drawings the actuator F comprises a ring-like member 16, supported on the driven member D' for movement longitudinally thereof, said member having key-seats fitting the keys 4 of said member and a series of spiral springs 17, disposed between the member 16 and the flange 9 on the driven member D', which springs normally retain the actuator F in a position to hold the ring-expander or cam in its ring-expanding position.

As one means for retracting the actuator to effect a contraction of the expansile ring a cam and lever device H is provided, which is automatic in its operation, said device preferably consisting of a suitable cam, as 18, supported in any well-known manner, and a lever, as 19, pivotally supported and bearing at one end against the inner face of the actuator F and at the opposite end against the cam, said lever being held in operative position with relation to the cam by the springs 17, which bear against the actuator F, as will be readily understood.

This clutch is especially adapted for use in connection with the work-holding spindle of a screw-machine or in any machine where it is advantageous to retain the clutch members D and D' normally in clutched engagement and wherein it is necessary to automatically effect a quick release of said members.

By providing a yielding or reactionary actuator for the friction-ring-expanding cam the driving and driven members may be clutched together while one of them is running at a high rate of speed without the injurious shocks sustained in clutches of this class wherein rigid means are employed for effecting an expansion of the friction-ring.

We claim—

1. A clutch embodying two concentric rotative members the outer one of which is loosely mounted upon the inner one and has an annular flange; a divided expansible ring disposed around the inner member in position to frictionally engage the flange of the outer member; a rotative ring-expanding cam pivotally connected to the inner member with its axis radial thereto and disposed between the ends of the ring, whereby to hold said ring against rotation with respect to said inner member, and which cam has a curved arm or lever extending partly around said inner member with its free outer edge projecting slightly beyond the outer face thereof; a reciprocatory actuator mounted upon the inner rotative member and including springs for normally retaining the same in an advanced ring-expanding position; and automatic means for imparting a retractive ring-releasing movement to said actuator.

2. A friction-clutch including a sleeve-like driven member having flanges at both ends thereof; a rotative driving member mounted upon said driven member and bearing against one of said flanges; a divided expansile ring disposed between said members in position to frictionally engage one member; a ring-expander carried by the driven member and having a portion disposed between the ends of said ring in position to expand the same; a ring-expander actuator mounted upon the driven member adjacent the other flange; and springs disposed between this flange and actuator and effective for retaining the actuator normally in operative engagement with the ring-expander.

3. A clutch embodying a rotative driven member; a divided expansile ring partly surrounding said member; an adjusting-screw movably seated in a screw-threaded opening extending from the extreme end to the periphery of the ring; an expanding-cam disposed between the ends of said ring and bearing against the end of said screw; cam-actuating means; and a rotative peripherally-flanged driving member mounted on the driven member in position to be frictionally engaged by the expansile ring having a peripheral opening adapted to register with the screw-threaded opening in the ring, to facilitate the adjustment thereof.

4. A clutch embodying a driven member having two diametrically-opposite key-seats formed longitudinally in the periphery thereof; keys seated therein; a driving member mounted for rotation on the driven member and having a recessed inner face; an expansile ring divided and comprising two members partly surrounding the driven member and located in the recess of the driving member in position to frictionally engage said last member; two ring-expanding cams pivotally supported at the inner ends of said keys and located between the adjacent ends of the ring members; two cam-levers, one formed on each cam, extending partly around the driven member with their outer free ends terminating substantially diametrically opposite each other; and means for concurrently actuating said levers.

5. The combination with a driven member having two diametrically-opposite longitudinal key-seats; a driving member mounted for rotation on the driven member; a two-section expansile ring disposed between the two members in position to operatively engage one member; keys loosely mounted in said key-seats and each having a pivot at the inner end thereof disposed radially with relation to the axis of the driven member; a ring-expander removably mounted on the pivot of each key between the adjacent ends of two ring-sections; and means for actuating said expanders.

Signed by us, at Hartford, Hartford county, Connecticut, this 7th day of December, A. D. 1899.

REINHOLD HAKEWESSELL.
EDWIN C. HENN.

Witnesses:
L. H. BLOOD,
E. C. WHITNEY.